Jan. 10, 1956 W. STEIN 2,729,971
APPARATUS FOR MEASURING SEDIMENTATION RATE OF BLOOD
Filed Oct. 27, 1952 2 Sheets-Sheet 1

INVENTOR
W. Stein
By Hancock Dowling Hecht
ATTYS.

Jan. 10, 1956     W. STEIN     2,729,971
APPARATUS FOR MEASURING SEDIMENTATION RATE OF BLOOD
Filed Oct. 27, 1952     2 Sheets-Sheet 2
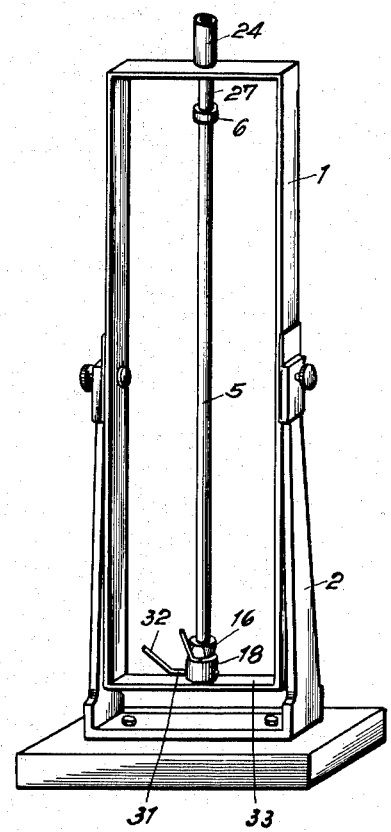
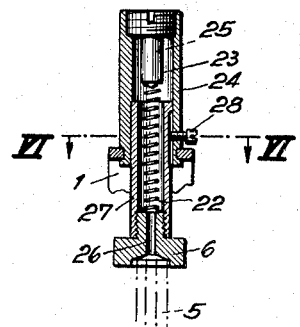
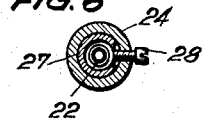
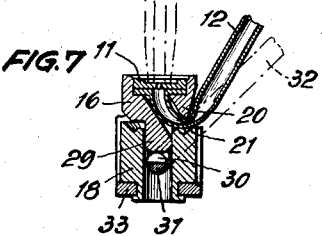
INVENTOR
W. Stein
By Glascock Downing Seeble
ATTYS United States Patent Office 2,729,971
Patented Jan. 10, 1956

2,729,971

APPARATUS FOR MEASURING SEDIMENTATION RATE OF BLOOD

Walter Stein, Nurnberg, Germany

Application October 27, 1952, Serial No. 316,995

Claims priority, application Germany May 10, 1952

7 Claims. (Cl. 73—61)

This invention relates to apparatus for measuring sedimentation rate of blood, in which at least one capillary tube, used for the intake of blood and open at both ends, is fastened in a frame and is resiliently pressed against its support. In the hitherto known contrivances of this kind it was necessary to provide a special device, for example, a bell, which, when operated, squeezed a rubber tube used for filling and draining and which, before the filling and draining of the capillary tube, had to be opened and closed by additional manual operations.

According to the present invention this disadvantage is obviated by the fact that the capillary tube, which serves as a filling and draining valve, is held in the closed position by the action of a spring.

The spring may be disposed at the upper end of the capillary tube, which in this case rests with its lower end on a stationary support, or else the capillary tube may abut against a rigid support with its upper end, whilst the bottom of the lower support is acted upon by a spring.

According to another feature of the invention, the valve consists of a rubber tube which opens into the lower support of the capillary tube and is disposed within the region of two jaws or the like acted upon by a spring so that they squeeze the tube tight in the closing position. The lower support of the capillary tube is preferably made integral with the valve tube and is provided with an aperture which reaches into the mouth of the tube and which lies within the duct of the capillary tube when the latter is inserted.

It is also advantageous to provide the upper support with a through bore of a diameter at least equal to that of the capillary tube, in order to enable tweezers, or a pipette to be used inside the capillary tube, when the latter is fastened in the frame. A special great advantage is achieved when the contrivance according to the present invention is used in apparatus for measuring sedimentation rate of blood in which the capillary tube used for the measuring is fastened in a frame which can be adjusted angularly relatively to a stationary support.

Various examples of construction of the contrivance according to the invention is diagrammatically illustrated in the accompanying drawings, in which:

Figure 4 shows another alternative form of the contrivance;

Figure 5 is a section through the upper support;

Figure 6 is a section along the lines VI—VI of Figure 5;

Figure 7 shows the lower support;

Figure 8 shows the lower support in the open position;

Figure 9 is a section through the support according to Figure 8 along the line IX—IX.

Figure 1:
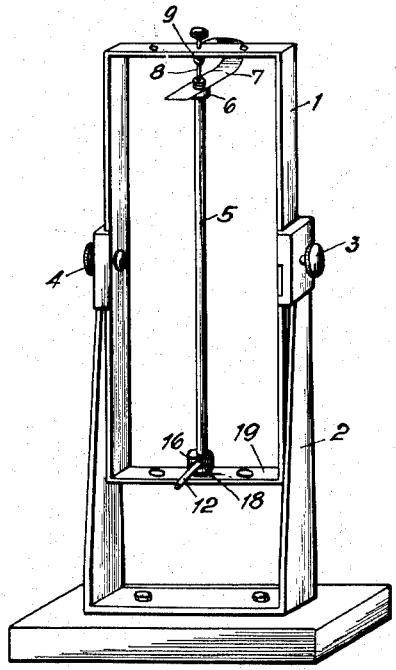
Figure 1 shows the contrivance with a capillary tube fastened in a frame.
Figure 2:
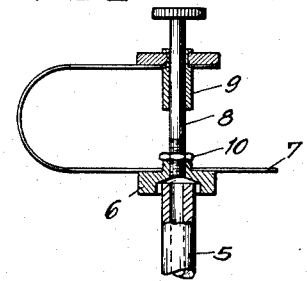
Figure 2 shows the attachment of the capillary tube to the upper end of the frame.
Figure 3:
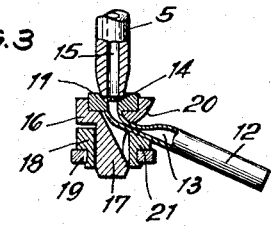
Figure 3 illustrates the valve.

The capillary tube 5 is fastened in a frame 1 which is pivotally mounted at the points 3 and 4 of a support 2 and can be locked in two different positions. The capillary tube 5 abuts at its upper end against a support 6, against which rests a U-shaped leaf spring 7. An adjusting screw 8, guided in a sleeve 9 of the upper part of the frame, and longitudinally adjustable by a nut 10, is screwed into the support 6. The capillary tube 5 is inserted at its lower end into the support 11, which is preferably of rubber, and is preferably integral with a valve tube 12, the duct 13 of which opens into the aperture 14 of the support; this aperture lies within the duct 15 of the capillary tube. The support 11 is inserted loosely in a ring 16, the latter being slidably mounted by means of a mandril 17 or the like in a second ring 18, which forms the bottom of the lower support. The latter is fastened in the lower part 19 of the frame 1.

The rings 16 and 18 are formed at two opposing points into jaws, between which the valve tube 12 is passed outwards, thus avoiding the use in this place of too sharp edges which would cause premature damage to the valve tube.

When the capillary tube is to be filled with the blood to be tested, the mandril 17 of the ring 16 is pressed a little upwards against the spring 7, thus opening the jaws 20 and 21 and the inlet and draining valve. Blood can now be pumped into the capillary tube. When the latter is full, the mandril 17 is released and returns into its initial position under the pressure of the leaf spring 7, which is transmitted through the capillary tube downwards, so that the tube 12 is again squeezed between the jaws 20 and 21. The capillary tube may, if desired, be brought, by swinging the frame 1, into an inclined position of about 60° relatively to the vertical, which is especially advantageous for measuring sedimentation rate of blood.

In a further construction according to the invention, shown in Figures 4 to 9, substantially the same component parts are used as those described above. The capillary tube 5 is fastened in a frame 1 which is pivotally mounted in the support 2. At the upper end of the frame 1 there is mounted a spring 22, which rests at one end against the screw 23 of the frame 1 and at the other end against the upper support 6, through which it acts upon the capillary tube 5. The screw 23, which is guided by means of a thread in the sleeve 24, is preferably provided with a bore 25, so that, if desired, for example, a pipette can be introduced into the capillary tube through the bore, the spring 22, and the bore 26 of the support 6. The upper support 6 carries a sleeve 27 screwed thereon; the latter is guided slidably but not rotatably in the sleeve 24 by means of a grub screw 28, which also keeps together all the component parts, when the capillary tube is removed.

The lower support is also made different in this alternative construction. The parts 11 and 12 show no change compared with those described above, but the ring 16 is provided with a shorter mandril 29, which bears against a recess 30 or a crank of the shaft 31. The latter is provided with a lever 32 and can be turned. The tube 12 can be squeezed between the jaws 20 and 21.

If the valve is to be opened, the shaft 31 is turned by pulling the lever 32 downward (Figures 4 and 7), so that the edge of its recess 30 presses the mandril 29 of the ring 16 upwards, thus opening the jaws 20 and 21 and releasing the tube 12 (Figure 8). The capillary tube can now be filled or drained, whereupon the lever 32 is released, and the capillary tube is pressed downwards by the spring 22 into the position shown in Figure 7.

Figure 10:
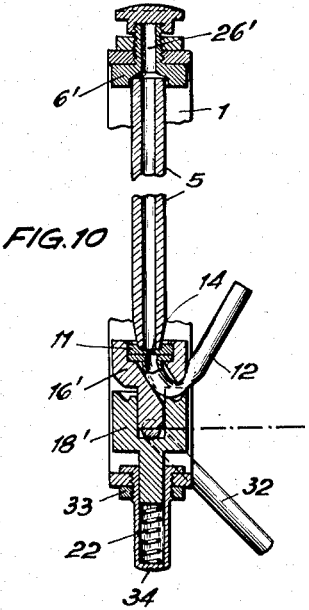
Figure 10 shows a mode of fastening the capillary tube when the upper support is rigid.

As shown in Figure 10, the spring 7 or 22, instead of pressing against the upper end of the capillary tube, may act upon the bottom part 18' and rest, by means of the sleeve 34 screwed into the swinging frame, against its lower part 33, so that the valve is held in the closed position by the slidable bottom part 18' of the lower support. An appropriate device, such as, for example, the lever 32 can then act in the opposite direction upon the bottom part 18' which thus is pressed downwards.

The advantage of this alternative arrangement resides therein that the capillary tube can rest at its upper end directly on the frame 1 or a rigid seat 6' which is shaped to conform with the part 6 and is provided with a bore 26'. In this way, it is easier to introduce an instrument into the capillary tube when it is fastened in the frame, in order either to draw blood or else to start some other operation.

I claim:

1. A blood testing device comprising a capillary tube for observation of the settlement of the red blood corpuscles, a frame to support said tube in a normally vertical position, a valve at the lower end of said tube, said valve comprising a cup-shaped body provided with an axially downwardly extending guide, there being a bore through said body from the center of the body at an angle through the side of the guide, an apertured sealing element seated in said body, a flexible hose extending from said body through said bore, a hose clamping ring to receive said guide, resilient means to urge the capillary tube, cup-shaped body and clamping ring axially toward each other to securely hold the sealing element against the capillary tube and to clamp the flexible hose between the valve body element and clamping ring, and a lever actuated cam element between the clamping ring and body element whereby the clamping pressure on the flexible hose may be relieved.

2. The device of claim 1, in which the resilient means comprises a U-shaped leaf spring bearing against the upper end of said capillary tube.

3. The device of claim 1, in which the upper end of said capillary tube is held in a downwardly spring pressed cup-shaped element.

4. The device of claim 1, in which the upper end of the capillary tube is held in a downwardly faced cup-shaped element provided with an axial bore.

5. The device of claim 1, in which the resilient means comprises a spring urging the clamping ring toward the assemblage of cup-shaped body and capillary tube.

6. The device of claim 1, in which the frame is mounted on a horizontal pivot for adjustment of the inclination of the capillary tube.

7. The device of claim 1, in which the upper support for the capillary tube comprises a centrally apertured cup-shaped element biased downwardly by a helical spring.

References Cited in the file of this patent

UNITED STATES PATENTS

| | | |
|---|---|---|
| 599,704 | Habermann | Mar. 1, 1898 |
| 2,102,785 | Brooks | Dec. 21, 1937 |
| 2,104,525 | Proskouriakoff | Jan. 4, 1938 |